United States Patent
Xia

(10) Patent No.: US 10,635,699 B2
(45) Date of Patent: Apr. 28, 2020

(54) FUZZY MATCHING FOR COMPUTING RESOURCES

(71) Applicant: ServiceNow, Inc., Santa Clara, CA (US)

(72) Inventor: Yu Xia, Union City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 370 days.

(21) Appl. No.: 15/586,037

(22) Filed: May 3, 2017

(65) Prior Publication Data

US 2018/0322189 A1 Nov. 8, 2018

(51) Int. Cl.
*G06F 16/00* (2019.01)
*G06F 16/33* (2019.01)
*H04L 12/24* (2006.01)
*G06F 16/22* (2019.01)
*G06F 16/903* (2019.01)

(52) U.S. Cl.
CPC ...... *G06F 16/3344* (2019.01); *G06F 16/2246* (2019.01); *G06F 16/3334* (2019.01); *G06F 16/90344* (2019.01); *H04L 41/085* (2013.01); *H04L 41/0859* (2013.01)

(58) Field of Classification Search
CPC ............. G06F 16/951; G06F 16/90344; G06F 16/355; G06F 16/9027; G06F 16/2462; G06F 11/3409; G06F 21/552; G06F 21/105; G06F 8/70; G06F 8/61; G06F 16/2246; G06F 16/3334
See application file for complete search history.

(56) References Cited

U.S. PATENT DOCUMENTS

| | | | | |
|---|---|---|---|---|
| 5,730,468 A | * | 3/1998 | Wirtz | G06K 9/00154 283/45 |
| 5,742,706 A | * | 4/1998 | Yu | G06F 7/02 382/229 |
| 7,546,316 B2 | * | 6/2009 | Dunning | G06F 17/2765 |
| 8,583,415 B2 | * | 11/2013 | Krishnan | G06F 17/2223 704/2 |
| 8,707,289 B2 | * | 4/2014 | Firman | G06F 8/60 717/170 |
| 8,756,499 B1 | * | 6/2014 | Kataoka | G06F 17/276 715/259 |
| 9,747,273 B2 | * | 8/2017 | Huang | G06F 17/273 |
| 2007/0220032 A1 | * | 9/2007 | Kapoor | G06F 8/61 |

(Continued)

OTHER PUBLICATIONS

Wikipedia, The Free Encyclopedia, "Damerau-Levenshtein distance", Date Unknown, Downloaded Mar. 10, 2017, <https://en.wikipedia.org/wiki/Damerau%E2%80%93Levenshtein_distance>, 5 pp.

*Primary Examiner* — Srirama Channavajjala
(74) *Attorney, Agent, or Firm* — Fletcher Yoder PC

(57) ABSTRACT

Systems and methods are disclosed for normalizing strings to identify computing resources and improve performance and utilization of computing resources. For example, methods may include determining a comparison length based on lengths of strings in a set of strings; padding a first string from the set of strings to the comparison length to obtain a padded string; receiving a second string; determining a distance between the second string and the padded string; and identifying a match between the first string and the second string based on the distance.

16 Claims, 9 Drawing Sheets

(56) References Cited

U.S. PATENT DOCUMENTS

| | | | |
|---|---|---|---|
| 2009/0113397 A1* | 4/2009 | Wright, Sr. | G06F 21/552 |
| | | | 717/127 |
| 2009/0171947 A1* | 7/2009 | Karayel | G06F 16/90344 |
| 2010/0131313 A1* | 5/2010 | Hansknecht | G06Q 10/02 |
| | | | 705/7.11 |
| 2010/0262454 A1* | 10/2010 | Sommer | G06F 16/355 |
| | | | 706/20 |
| 2010/0325149 A1* | 12/2010 | Etchegoyen | G06F 11/3409 |
| | | | 707/769 |
| 2012/0078919 A1* | 3/2012 | Mineno | G06F 17/278 |
| | | | 707/748 |
| 2013/0066898 A1* | 3/2013 | Wu | G06F 16/951 |
| | | | 707/769 |
| 2013/0254742 A1* | 9/2013 | Hockings | G06F 8/70 |
| | | | 717/120 |
| 2013/0325884 A1* | 12/2013 | Soel | G06F 17/2211 |
| | | | 707/758 |
| 2014/0137261 A1* | 5/2014 | Chen | G06F 21/105 |
| | | | 726/26 |
| 2016/0203198 A1* | 7/2016 | Roytblat | G09B 29/006 |
| | | | 707/756 |

\* cited by examiner

FUZZY MATCHING FOR COMPUTING RESOURCES

BACKGROUND

Computing networks can be large and complex, consisting of many thousands of hardware and software components. Maintaining and operating a large network can present many challenges. One challenge is keeping track of what computing resources are installed in the computing network. Discovery techniques may be employed to gather data about the computing resources installed or operating within a computing network. The data gathered about the computing resources in the network may be stored in a database with records associated with particular computing resources to model the current state or structure of the computing network.

SUMMARY

Disclosed herein are implementations of fuzzy matching for computing resources.

In an implementation, a system is provided for normalizing strings to identify computing resources and facilitate computing network operations. The system may include a memory and a processor. The memory includes instructions executable by the processor to cause the system to determine a comparison length based on lengths of strings in a set of strings, where the strings in the set of strings are associated with computing resources; pad a first string from the set of strings to the comparison length to obtain a padded string; receive a second string; determine a count of character operations to transform from the second string to the padded string; and identify a match between the first string and the second string based on the count.

In an implementation, a system is provided for facilitating matching of heterogeneous strings to identify computing resources and improve performance and utilization of computing resources. The system may include a memory and a processor. The memory may include instructions executable by the processor to cause the system to pad a first string from a set of strings to a comparison length to obtain a padded string; receive a second string; determine a count of character operations to transform from the second string to the padded string; and identify a match between the first string and the second string based on the count.

In an implementation, a method is provided for normalizing strings to identify computing resources and improve performance and utilization of computing resources. The method may include determining a comparison length based on lengths of strings in a set of strings; padding a first string from the set of strings to the comparison length to obtain a padded string; receiving a second string; determining a distance between the second string and the padded string; and identifying a match between the first string and the second string based on the distance.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
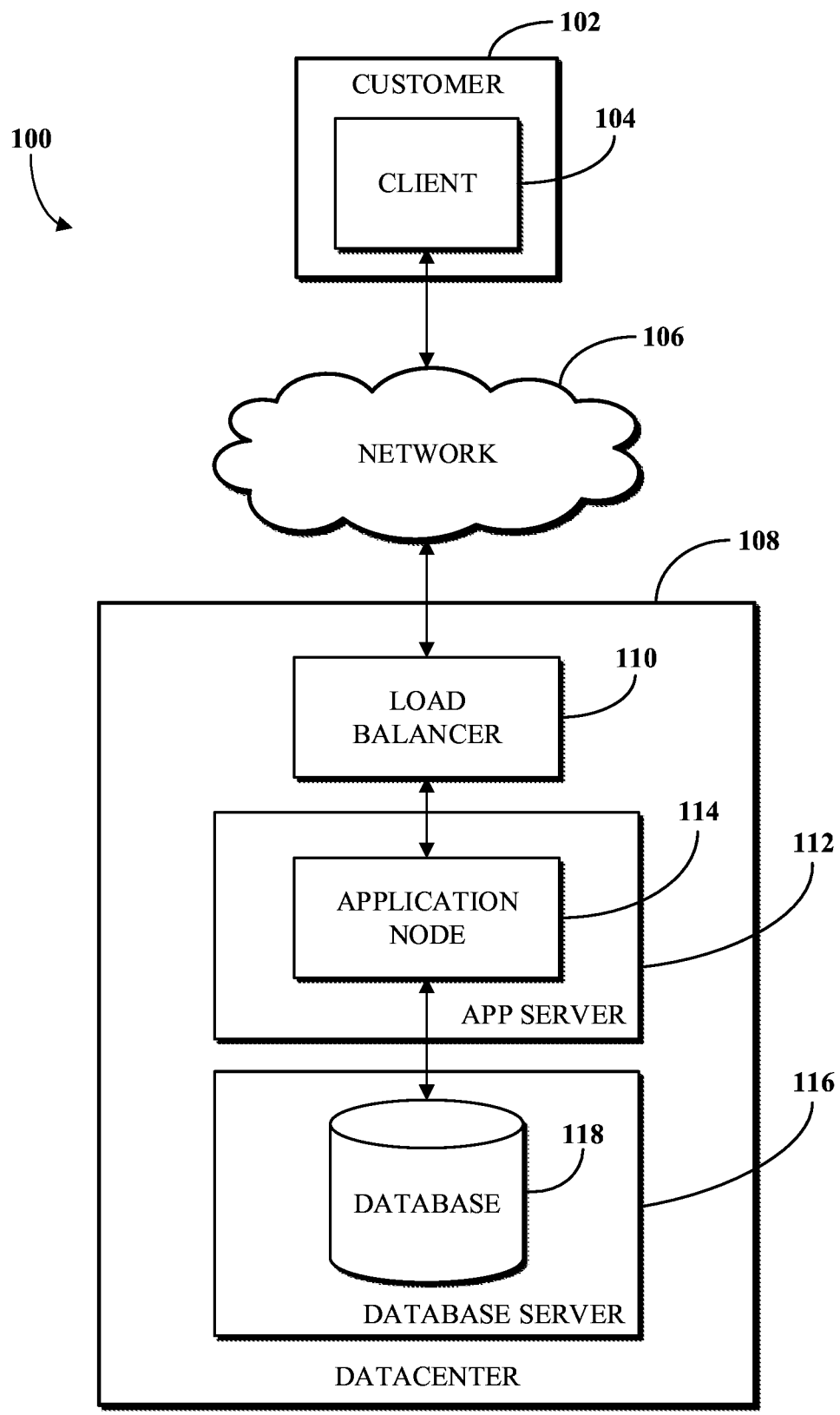
FIG. 1 is a diagram of an example of an electronic computing and communications system.

This document includes disclosure of systems, apparatus, and methods for identifying computing resources in a computing network to facilitate efficient operation of the computing network. For example, discovery techniques may be employed to find computing resources (e.g., hardware components or software components) that are installed or operating within a network, such as a large corporate or enterprise network. For example, the network can be probed to find hardware or software components, information about components can be received via user input, or combinations thereof. In practice, a corporate network may be probed to identify the laptops used by the corporation's employees, possibly to automate upgrades to the laptops. In another example, the corporate network may be probed to identify servers, routers, and/or other computers, among other hardware or software components, to deploy patches or updates to various such devices. The results of such discovery techniques may include strings of text or other data that describes a discovered computing resource.

Given that data about the computing resources may be discovered from a multitude of sources, certain descriptive information may have a number of variations which may limit the effective use of the data. For example, a name of a software application, a publisher of a software application, or a version of a software application may take various forms (e.g., a publisher could include a number of variations of "ServiceNow", such as servicenow, snow, now, NOW, Service-Now, service-now.com, and the like).

An approach to normalizing these descriptions is to match the discovered description with a database of known descriptions of recognized computing resources. For example, a database may associate the descriptions "servicenow", "now", and "snow" with "ServiceNow". However, the data describing a discovered computing resource may not exactly match any known descriptions of recognized computing resources. For example, there may be no defined association between "service-now.com" and "ServiceNow". This may be because, for example, the discovered computing resource may be encountered for the first time by a computing network operations system, or because the descriptive data found may include errors or variations due to manual entry.

In the absence of a match, a computing network operations system may not be configured to handle the discovered computing resource, causing inefficiencies in the operation of the network. In some computing networks, the number (e.g., tens of thousands) of these unrecognized computing resources can be a substantial portion (e.g., half or more) of the computing resources in the computing network, and this can significantly impact the usefulness of the data describing the computing resources. Identifying these unrecognized computing resources and normalizing their descriptive data to match the records of known computing resources can facilitate handling of these computing resources and improve operations of a computing network.

In order to identify unrecognized computing resources, a string describing an unrecognized computing resource may be compared to strings from a set of strings describing respective computing resources. The string may be compared by determining a distance (e.g., a Damerau-Levenshtein distance or a Levenshtein distance) between the string and a string from the set. In some implementations, a count of character operations needed to transform one string to another may be determined to compare two strings. For example, a comparison using a Levenshtein distance counts a minimum number of single character insertion, deletion, and/or substitution operations to transform one string into another. The distances to multiple strings from the set may be compared and string from the set with a relatively small distance may be identified as a good match for the string describing the unrecognized computing resource.

However, a distance metric (e.g., a Damerau-Levenshtein distance or a Levenshtein distance) may bias the system in favor of selecting short strings from the set of strings, because longer strings may require more operations to match the full string. For example, suppose the string for an unrecognized computing resource is "Microsoft" and that two strings from the set are "Adobe" and "Microsoft Windows Premium v1.1.1". The distance to the first string from the set may be determined as 8 (i.e., deleting or replacing all but one "o" from "Microsoft" to get "Adobe"). The distance to the second string from the set may be determined as 23 (i.e., inserting "Windows Premium v1.1.1"). So a system directly applying this distance metric to compare stings may incorrectly identify "Adobe" as the better match for "Microsoft".

To mitigate this bias, stings in the set of strings may be padded to a comparison length for the purposes of these comparisons. For example, stings in the set may be padded to a comparison length with randomly generated characters. For example, stings in the set may be padded to a comparison length with special escaped characters that do not occur in the strings to be compared. In the prior example, suppose a comparison length of 36 characters is used and the strings in the set are padded to 36 characters with escaped characters, so "Adobe" is padded with 31 escaped characters and "Microsoft Windows Premium v1.1.1" is padded with 4 escaped characters. Distances to the padded strings may be determined as 36 (i.e., substitute or insert the entire padded string) for the first padded string and 27 (i.e., insert the last 27 characters of the padded string) for the second padded string. With padding, the distance for the longer string with more overlap may be selected in favor of the initially shorter string with less overlap.

A comparison length that will be used with a set of strings may be determined based on an analysis of the string lengths for the set of strings. For example, the comparison length may be determined as a weighted average of the lengths of the strings in the set of strings. In some implementations, weights used to determine a comparison length may be based on computing resource installation frequency data associated with the respective computing resources for the strings in the set. For example, strings corresponding to publisher names for software resources may be assigned weights based on an installation base or frequency for a software publisher. For example, strings corresponding to product names for software resources may be assigned weights based on an installation base or frequency for a software publisher or based on an installation base or frequency for a software product. In some implementations, a comparison length used for a set of string may be updated when the set of strings is updated by adding, removing, or modifying strings in the set. For example, when a new product description is added to a table of product descriptions for normalized computing resources, a comparison length for the product description strings in the table may be updated based on the length of the new product description string and a weight (e.g., a weight based on an installation frequency associated with the product described by the string).

These string matching techniques may be used to facilitate management and operations of computing resources in computing network in a variety of ways. For example, a system may track usage of software in a computing network by scanning active processes and programs running on computing devices within the computing network. The example system may also track installed software by examining software registry data from computing devices within the computing network. The software usage data may be analyzed to determine whether certain software computing resources are underutilized and should be uninstalled for efficiency. However, data from these two sources (i.e., registry data and running processes data) may not match up exactly. A software product installed in a computer may be represented by different strings in the registry and the running processes interface. To address this problem, a string representing a software computing resource that has been marked for uninstallation may be compared to strings in a set of strings describing installed software computing resources using the techniques described above. A comparison length may be determined for the set of product descriptions for installed software in the computing network. The string describing the software computing resource marked for uninstallation may then be compared to strings from the set of strings using a string distance (e.g., a Damerau-Levenshtein distance or a Levenshtein distance), with the strings from the set padded to this comparison length. A string from the set may be selected based on having a relatively low distance and software computing resource associated with the selected string may be uninstalled.

Implementations of this disclosure provide technological improvements particular to computer networks, for example, the processes for automated identification of computing resources occurring in a computing network may be improved. Computer network-specific technological problems, such as unrecognized computing resources (e.g., software) preventing or impeding proper maintenance and operation of a computing network, can be wholly or partially solved by implementations of this disclosure. For example, a fuzzy matching technique may be used to identify matches between unrecognized computing resources and normalized records to facilitate maintenance and operation of computing networks. Implementations of this disclosure can thus introduce new and efficient improvements in the ways in which computing resources (e.g., hardware components or software components) are identified by determining a comparison length used for assessing matches between unrecognized descriptive data and descriptive data for known computing resources.

To describe some implementations in greater detail, reference is first made to examples of hardware structures. FIG. 1 is a diagram of an example of an electronic computing and communications system 100. As used herein, the term "electronic computing and communications system," or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit, or as a combination of physical units. In some implementations, a single physical unit can include multiple clients.

The client 104 can be an instance of an application running on a customer device associated with the customer 102. The system 100 can include any number of customers and/or clients and/or can have a configuration of customers and/or clients different from that generally illustrated in FIG. 1. For example, and without limitation, the system 100 can include hundreds or thousands of customers, and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers and/or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated and/or communicate with one or more datacenter networks and/or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, and/or path or using a distinct connection point, link, and/or path. A connection point, link, or path can be wired, wireless, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

The application server 112 can include any suitable number of application nodes, depending upon a system load and/or other characteristics associated with the application server 112. For example, and without limitation, the application server 112 can include two or more nodes forming a node cluster. The application nodes implemented on a single application server 112 may run on different hardware servers.

The database server 116 can be configured to store, manage, or otherwise provide data for delivering services to the client 104 over a network. The database server 116 may include a data storage unit, such as a current database 118, which can be accessible by an application executed on the application server 112. The current database 118 may be implemented as a relational database management system (RDBMS), an object database, an XML database, a configuration management database (CMDB), a management information base (MIB), one or more flat files, or the like, or a combination thereof. By way of non-limiting example, the system 100, in some implementations, can include an XML database and a CMDB. While limited examples are described, the current database 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can comprise a plurality of configuration items (CIs). A CI can be a CMDB record that represents an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communications system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MIB.

One or more databases (e.g., the current database 118), tables, other suitable information sources, and/or portions or combinations thereof can be stored, managed, or otherwise provided by one or more of the elements of the system 100 other than the database server 116, such as the client 104 and/or the application server 112.

Some or all of the systems and techniques described herein can operate and/or be executed on or by the servers associated with the system 100. For example, an SCCM (System Center Configuration Manager) database of the customer 102 can be searched for data describing installed and/or running software computing resources in response to a message by a software module executed on the application node 114, and a table installed and/or running software computing resources in the database 118 may be updated based on results of a search received by the application server 112. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, and/or both can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. The secondary database can include an exact or substantially exact mirror, copy, or replication of the primary database. The primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations from being performed directly on the secondary database. In the event that a failover condition associated with the primary database is identified, the secondary database can operate as the primary database and can allow read and/or write access to data. The primary database can then operate as the secondary database, mirror the new primary database, and prevent direct write access to the new secondary database.

A distributed computing system can allocate resources of a computer network using a multi-tenant or single-tenant architecture, for example. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof can be provisioned for at least some customers and/or customer sub-units. Customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof can be installed on the same physical server. An installation can be allocated a portion of the physical server resources, such as RAM, storage, communications bandwidth, and/or processor cycles.

A customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
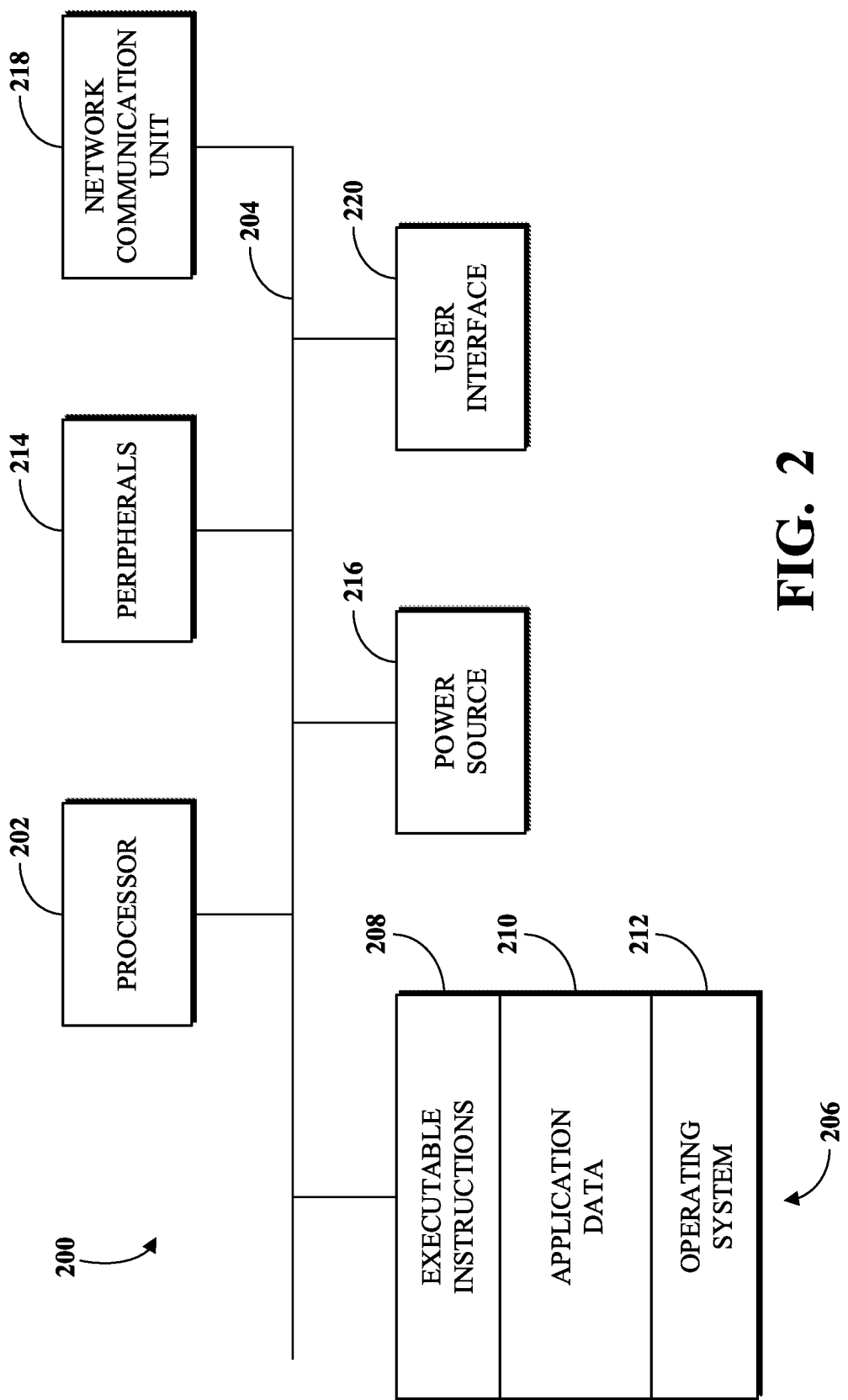
FIG. 2 is a block diagram of an example internal configuration of a computing device of the electronic computing and communications system shown in FIG. 1.

FIG. 2 generally illustrates a block diagram of an example internal configuration of a computing device 200, such as a client 104 and/or a server, such as an application server 112 and/or a database server 116, of the electronic computing and communications system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices. A computing device 200 can include components and/or units, such as a processor 202, a bus 204, a memory 206, peripherals 214, a power source 216, a network communication unit 218, a user interface 220, other suitable components, and/or any combination thereof.

The processor 202 can be a central processing unit (CPU), such as a microprocessor, and can include single or multiple processors, having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other type of network. In some implementations, the processor 202 can include a cache, or cache memory, for local storage of operating data and/or instructions. The operations of the processor 202 can be distributed across multiple machines, which can be coupled directly or across a local area or other type of network.

The memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. The memory 206 can include another type of device, or multiple devices, now existing or hereafter developed, capable of storing data and/or instructions for processing by the processor 202. The processor 202 can access and/or manipulate data in the memory 206 via the bus 204. Although shown as a single block in FIG. 2A, the memory 206 can be implemented as multiple units. For example, a computing device 200 can include volatile memory, such as RAM, and persistent memory, such as a hard drive or other storage. The memory 206 can be distributed across multiple machines, such as network-based memory or memory in multiple machines performing the operations of clients and/or servers.

The memory 206 can include executable instructions 208; data, such as application data 210; an operating system 212; or a combination thereof for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof to perform various functions described herein. For example, the executable instructions 208 can include instructions to determine a comparison length based on lengths of strings in a set of strings; pad a first string from the set of strings to the comparison length to obtain a padded string; receive a second string; determine a distance between the second string and the padded string; and identify a match between the first string and the second string based on the distance.

The application data 210 can include, for example, user files; database catalogs and/or dictionaries; configuration information for functional programs, such as a web browser, a web server, a database server; and/or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself and/or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, a client and/or server can omit the peripherals 214. In some implementations, the power source 216 can be a battery, and the computing device 200 can operate independently of an external power distribution system. Any of the components of the computing device 200, such as the peripherals 214 or the power source 216, can communicate with the processor 202 via the bus 204. Although depicted here as a single bus, the bus 204 can be composed of multiple buses, which can be connected to one another through various bridges, controllers, and/or adapters.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
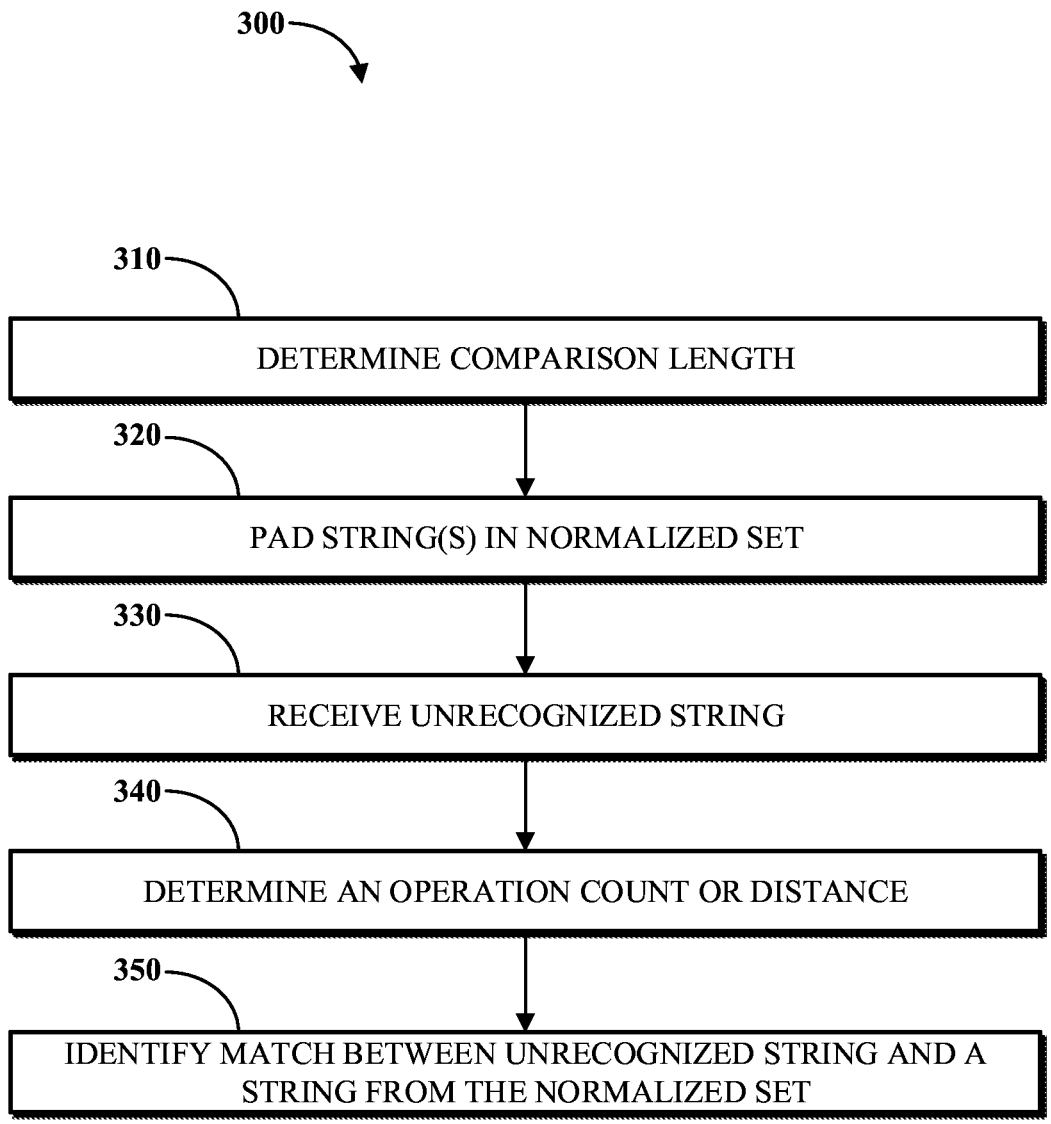
FIG. 3 is a logic flowchart illustrating an example of a technique for matching a string to a member of a set of normalized strings.

FIG. 3 is a flowchart illustrating an example of a technique 300 for matching a string to a member of a set of normalized strings in an electronic computing and communications system, such as the system 100 as generally illustrated in FIG. 1. In some implementations, the technique 300 can be executed using computing devices, such as the systems, modules, and devices described with respect to FIGS. 1, 2, 5, 6, 8, and 9. In some implementations, the technique 300 can be performed, for example, by executing a machine-readable program or other computer-executable instructions, such as instructions or programs described according to JavaScript, C, or other such instructions. The steps, or operations, of the technique 300 or any other technique, method, process, or algorithm described in connection with the implementations disclosed herein can be implemented directly in hardware, firmware, software executed by hardware, circuitry, or a combination thereof.

The example technique 300 includes determining 310 a comparison length based on lengths of strings in a set of strings, padding 320 a string from the set of strings to the comparison length to obtain a padded string, receiving 330 an unrecognized string, determining 340 an operation count or distance between the unrecognized string and the padded string, and identifying 350 a match between the string from the set and the unrecognized string based on the operation count or distance. For example, strings from the set of strings may be associated with computing resources (e.g., software components or hardware components in a computing network). In some implementations, the technique 300 may be used to normalize strings to identify computing resources and facilitate computing network operations. For example, the technique 300 may be used to facilitate matching of heterogeneous strings to identify computing resources and improve performance and utilization of computing resources.

The example technique 300 includes determining 310 a comparison length based on lengths of strings in a set of strings. In some implementations, the strings in the set of strings are associated with computing resources. For example, the strings in the set of strings may be the values of description fields of respective configuration items that are stored in a CMDB (e.g., in the database 118) and that represent respective computing resources (e.g., software components or hardware components) in a computing network (e.g., the customer 102). For example, the set of strings may include strings in a table of normalized product names. For example, the set of strings may include strings in a table of normalized software publisher names. For example, the set of strings may include strings in a table of normalized product descriptions.

The comparison length may be used for padding 320 strings in the set of strings for comparison to an unrecognized string. Padding 320 the strings in the set out to at least the comparison length may help to mitigate bias of a string distance metric that is used to make the comparison. As described above, this bias may favor the selection of short strings over long strings, even when the long strings have more overlap with an unrecognized string, which may lead to counterintuitive and unfavorable results. In some implementations, strings from the set of strings that are shorter than the comparison length are padded 320 to the comparison length, while longer strings may be left unchanged. In some implementations, all strings in the set of strings are padded 320 to the same length (e.g., the comparison length). Thus, depending on the implementation, the strings from the set of strings may all be the same length for comparison cases or they may be closer in length for comparison cases than they were initially. In some implementations (e.g., where strings are padded 320 with randomly generated characters), padding 320 may introduced some noise to the string comparison for matching process. An average noise level may be proportional to the number of characters added by padding 320 and thus to the comparison length. Thus, in choosing the comparison length, there may be a trade-off between noise from padded characters and bias from having short strings in the pool of strings that are compared to an unrecognized string.

For example, the comparison length may be determined 310 to be equal to the maximum length of a string in the set of strings. In some implementations, the comparison length is determined 310 as weighted average of the lengths of strings in set of stings. For example, the weights may be determined based on data reflecting installation counts or frequency for computing resources. For example, the weight for a string associated with a software component may be determined based installation counts or frequency for a software publisher that publishes the software component. For example, the technique 400 of FIG. 4 may be implemented to determine 310 the comparison length. For example, the comparison length may be determined 310 by the application node 114, by the platform instance 550, by the platform instance 650, or by the centralized data server instance 910.

The example technique 300 includes padding 320 a string from the set of strings to the comparison length to obtain a padded string. For example, padding 320 the string may include appending one or more randomly generated characters to the string. For example, randomly generated characters may be appended at the beginning and/or at the end of the string until the padded string has length in characters equal to the comparison length. For example, padding 320 the string may include appending one or more escaped characters to the first string, wherein the one or more escaped characters do not to occur in the set of strings. For example, escaped characters may be appended at the beginning and/or at the end of the string until the padded string has length in characters equal to the comparison length. In some implementations, the string is padded 320 by storing a string with the characters of the string and additional characters (e.g., randomly generated characters or escaped characters). In some implementations, the string is padded 320 by notating a padded length (e.g., the comparison length) that is associated with the string being padded. Actually copies of a special escaped character value need not be written to form the padded string. During a comparison operation for the string, additional character operations may be added to a count of such character operations for all the escaped characters added to the padded string in such a notation, to account for the operations that would be needed to match the escaped characters. In other words, it is not necessary for the escaped characters to have a particular value, since they are assumed not to match any string being compared. In some implementations, where the comparison length has been determined to be less than or equal to the length of the string from the set of strings, this string may be left unchanged by the padding (at operation 320).

The example technique 300 includes receiving 330 an unrecognized string. For example, the unrecognized string may be received 330 via network interface (e.g., the network communication unit 218). For example, the unrecognized string may be received 330 from a memory (e.g., the memory 206) via a bus (e.g., the bus 204). In some implementations, the unrecognized string may be received 330 from an agent device (e.g., the MID server 540) or another source (e.g., the SCCM database 520) in a private network being operated (e.g., the private network 560). In some implementations, the unrecognized string may be received 330 from the database server 116. In some implementations, the unrecognized string may be received 330 from a platform instance (e.g., the customer 1 platform instance 920) managing a private network from outside of the private network.

The example technique 300 may include determining 340 a distance between the unrecognized string and the padded string. For example, determining 340 the distance may include determining a Damerau-Levenshtein distance between the unrecognized string and the padded string. For example, determining 340 the distance may include determining a Levenshtein distance between the unrecognized string and the padded string. For example, the determining 340 the distance may include using a dynamic programming algorithm to determine a Damerau-Levenshtein distance between the second string and the padded string.

The example technique 300 may include determining 340 a count of character operations to transform from the unrecognized string to the padded string. For example, determining 340 the count of character operations may include determining a Damerau-Levenshtein distance between the unrecognized string and the padded string. For example, determining 340 the distance may include determining a Levenshtein distance between the unrecognized string and the padded string. For example, determining 340 the count may include using a dynamic programming algorithm to determine a Damerau-Levenshtein distance between the unrecognized string and the padded string.

The example technique 300 includes identifying 350 a match between the string from the set and the unrecognized string based on the distance or the count of character operations to transform from the unrecognized string to the padded string. For example, identifying 350 the match may include comparing the count or distance to a threshold, and identifying the match between the string from the set and the unrecognized string responsive to the count or distance being below the threshold. In some implementations, counts or distances for multiple strings from the set (e.g., all of the strings in the set) are determined 340 and a match is identified 350 by selecting a string from the set with a relatively low distance or count of operations. For example, a string from the set of strings with the lowest distance or count of operations with respect to the unrecognized string may be identified 350 as a match for the unrecognized string.

Although the technique 300 is shown as a series of operations for clarity, implementations of the technique 300 or any other technique, process, or algorithm described in connection with the implementations disclosed herein can be performed in various orders or concurrently. Additionally, operations in accordance with this disclosure can be performed with other operations not presented and described herein. For example, a technique using technique 300 may also include, responsive to the identified match, modifying the unrecognized string based on the identified matching string from the set of strings to obtain a normalized string; and storing, displaying, or transmitting the normalized string. For example, a technique using technique 300 may also include truncating strings from the set of strings that are longer than the comparison length down to the comparison length for the comparison operation. Furthermore, one or more aspects of the systems and techniques described herein can be omitted. For example, determining 310 the comparison length is an operation that may be omitted.

Figure 4:
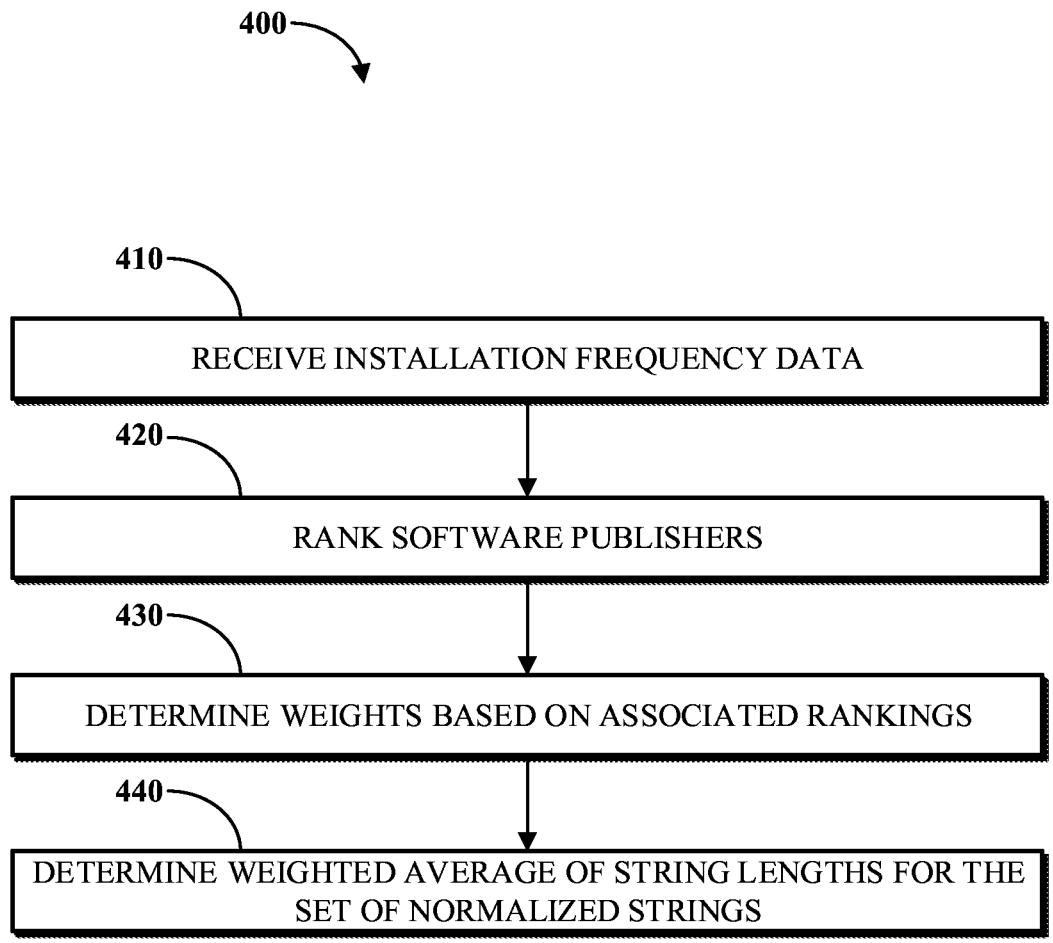
FIG. 4 is a logic flowchart illustrating an example of a technique for determining a comparison length for a set of strings.

FIG. 4 is a flowchart illustrating an example of a technique 400 for determining a comparison length for a set of strings in an electronic computing and communications system, such as the system 100 as generally illustrated in FIG. 1. In some implementations, the technique 400 can be executed using computing devices, such as the systems, modules, and devices described with respect to FIGS. 1, 2, 5, 6, 8, and 9. In some implementations, the technique 400 can be performed, for example, by executing a machine-readable program or other computer-executable instructions, such as instructions or programs described according to JavaScript, C, or other such instructions. The steps, or operations, of the technique 400 or any other technique, method, process, or algorithm described in connection with the implementations disclosed herein can be implemented directly in hardware, firmware, software executed by hardware, circuitry, or a combination thereof.

The example technique 400 includes receiving 410 installation frequency data; ranking 420 software publishers based on the installation frequency data; determining 430 weights for the string lengths based associated rankings; and determining 440 a weighted average of string lengths for the set of normalized strings. For example, the technique 400 may be initiated responsive to an update of the set of strings (e.g., by adding or removing one or more strings from the set of strings).

The example technique 400 includes receiving 410 installation frequency data (e.g., by software publisher or by software product). For example, the installation frequency data may be received 410 via network interface (e.g., the network communication unit 218). For example, the installation frequency data may be received 410 from a memory (e.g., the memory 206) via a bus (e.g., the bus 204). For example, installation frequency data may be received 410 from software publisher web sites. The selection of weights for strings in a set of strings may be based on associated installation frequency data. For example, installation frequency data may reflect the chances that a string associated with a computing resource will be encountered by a system performing discovery an operations management for one or more private computing networks.

The example technique 400 includes ranking 420 software publishers associated with strings in the set of strings based on indications of an extent or frequency of installations of software published by the software publishers. For example, a set of 100 software publishers may be associated with various software components occurring in a private computing network that are represented by configuration items in a CMDB. These 100 software publishers be may be ranked from 1 to 100 based on indications of an extent or frequency of installations of software published by software publishers. Ranking 420 the software publishers may serve to map installation frequency data to a range that may be used to determine 430 a set of weights.

The example technique 400 includes determining 430 respective weights for strings in the set of strings based on the rank of a software publisher associated with the respective string. For example, the weights for strings in the set may be determined 430 to vary linearly with the rank of the software publisher. In some implementations, the weights for strings in the set may be determined 430 such that the sum of the weights for the strings in the set of strings is one. For example, a weight for a publisher name string in a table of publisher names may be determined 430 as the weight for the software publisher based on the rank of that publisher. Rank of a software publisher may be used as a proxy for the rank of software products published by the publisher. For example, a weight for a product name string in a table of product names may be determined 430 as a weight for a software publisher associated with the software product (e.g., the software publisher that publishes this software product). In some implementations, weights may reflect the probability that a string in the set of strings will be implicated by and/or a close match for an unrecognized string encountered in a computing network. For example, using weights to determine a comparison length may tailor the comparison length to the dataset under consideration and improve efficiency and/or accuracy of computing network operations system.

The example technique 400 includes determining 440 a weighted average of lengths of strings in the set of strings using the respective weights for the strings in the set of strings. For example, the weighted average may be determined as a sum over the set of strings of the product of a string length and its respective associated weight.

The comparison length may be determined based on the weighted average of the lengths of strings in the set of strings. For example, the comparison length may be determined to be the weighted average of the lengths of strings in the set of strings. For example, the comparison length may be determined to be the weighted average of the lengths of strings in the set of strings rounded to the nearest integer number of characters. For example, the comparison length may be determined to be the weighted average of the lengths of strings in the set of strings rounded to the nearest integer number of characters plus an offset (e.g., a fixed offset such as 1 character).

Although the technique 400 is shown as a series of operations for clarity, implementations of the technique 400 or any other technique, process, or algorithm described in connection with the implementations disclosed herein can be performed in various orders or concurrently. Additionally, operations in accordance with this disclosure can be performed with other operations not presented and described herein. For example, a non-linear mapping (e.g., a saturation mapping imposing a maximum and/or a minimum value for the comparison length) may be applied to the weighted average (determined at operation 440) to determine the comparison length. Furthermore, one or more aspects of the systems and techniques described herein can be omitted. For example, receiving 410 installation frequency data is an operation that may be omitted.

Figure 5:
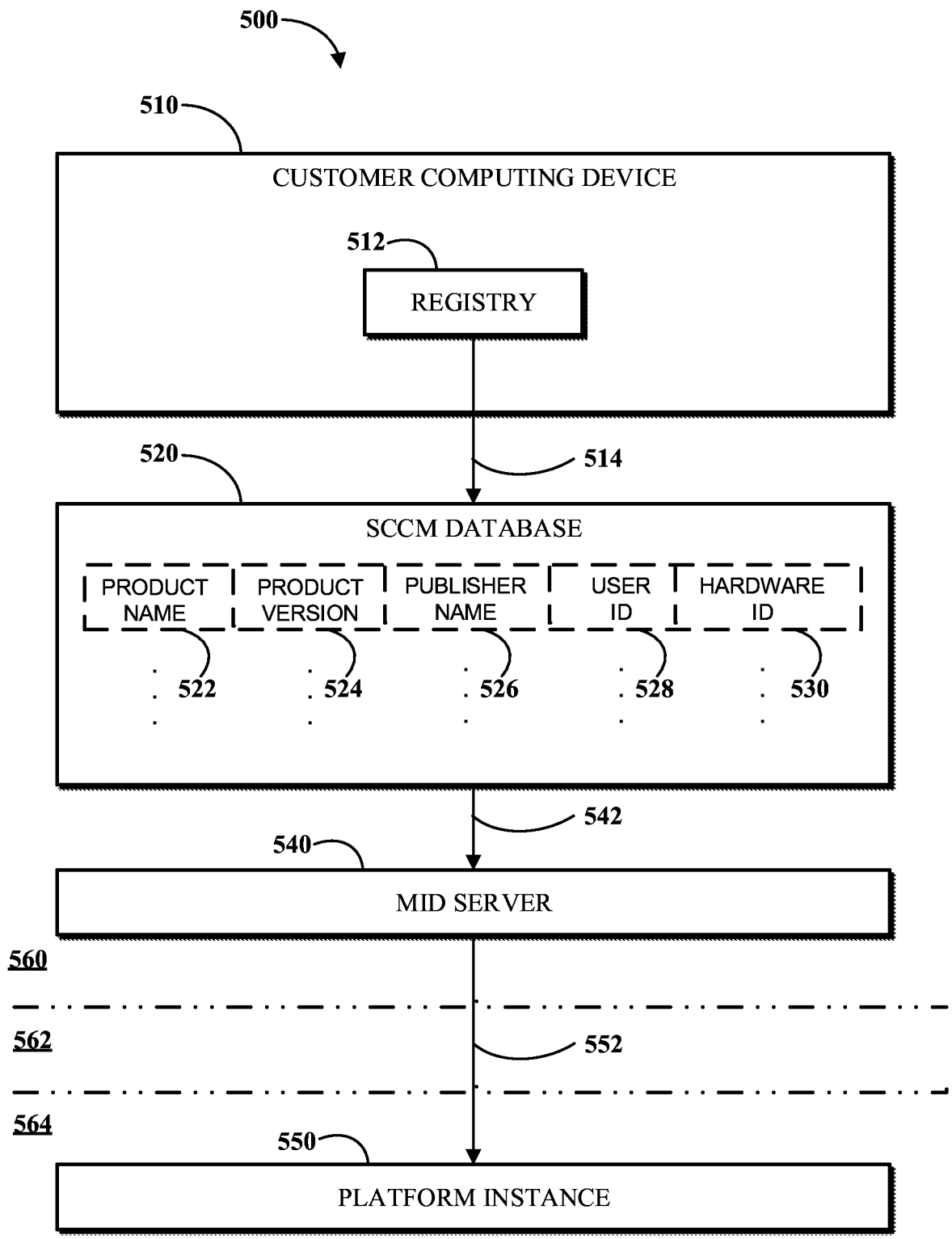
FIG. 5 is a block diagram of an implementation of a system usable for tracking software installations in a computing network.

FIG. 5 is a block diagram of an implementation of a system 500 usable for tracking software installations in a computing network. Two important aspects of software asset management are tracking software installation and tracking software usage. For example, these two aspects are the basis for software deployment and operations optimization. There are many ways to track software installation, including invoking discovery probes against devices operating in a computing network and/or querying a systems management software product (e.g., Microsoft System Center Configuration Manager® (herein after "SCCM")), etc. Many of these ways to track software installation ultimately derive the installation information by scanning software installation information from the respective registries of computing devices in a computing network. The system 500 is operable to implement such a technique for gathering software installation information for software installation tracking. Technique 300 of FIG. 3 and technique 400 of FIG. 4 may be applied to strings in data gathered and processed by the system 500.

The example system 500 includes a customer computing device 510 with a registry 512 that includes information about software installed on the computing device 510. For example, the customer computing device 510 may include the computing device 200 and the registry may be included in the memory 206.

The example system 500 includes an SCCM database 520, which may be running on a computing device in a private network 560 (e.g., a firewalled private network) with the customer computing device 510. In some implementations (not shown), the SCCM database 520 may run on the customer computing device 510. The SCCM database 520 includes a table of software installation data for computing devices operating within the private network 560. The table of software installation information may be populated by scans of registries of computing devices in the private network 560. For example, a scan 514 of the registry 512 of the customer computing device 510 may be conducted to gather information about software installed on the customer computing device 510 and update records in the table based on this gathered information. Records in this table include the fields: product name 522, product version 524, publisher name 526, user ID 528; and hardware ID 530. These fields may be strings. A user ID 528 (e.g., a user name or credential) may identify a user or group of users that are authorized to use a software component installed on a computing device in the private network 560. A hardware ID 530 (e.g., a computer name or network address) may identify a hardware component on which the software component corresponding to the record is installed.

The example system 500 includes management instrumentation and discovery (MID) server 540, which may be operating in the private network 560. The MID server 540 may be configured to perform discovery operations (e.g., invoking discovery probes) on behalf of a platform instance 550 that manages operations of the private network 560 from outside of the private network 560. The MID server 540 may query 542 the SCCM database 520 to retrieve information from the table about software components installed in the private network 560. The MID server may then relay to the platform instance 550 discovery probe data 552 that is based on the results of the query 542. The discovery probe data 552 may be transmitted from the private network 560, via an intermediary network 562 (e.g., the Internet), to the platform instance 550 operating in a provider network 564 (e.g., in the datacenter 108).

The platform instance 550 may store records (e.g., configuration items) based on the discovery probe data 552. For example, the platform instance may run on the application server 112. For example, configuration items in a CMDB (e.g., running on the database server 116) maintained by the platform instance 550 may be generated or updated based on the discovery probe data 552. This stored data (e.g., configuration items in a CMDB) may represent the software components installed on computing devices within the private network 560.

Figure 6:
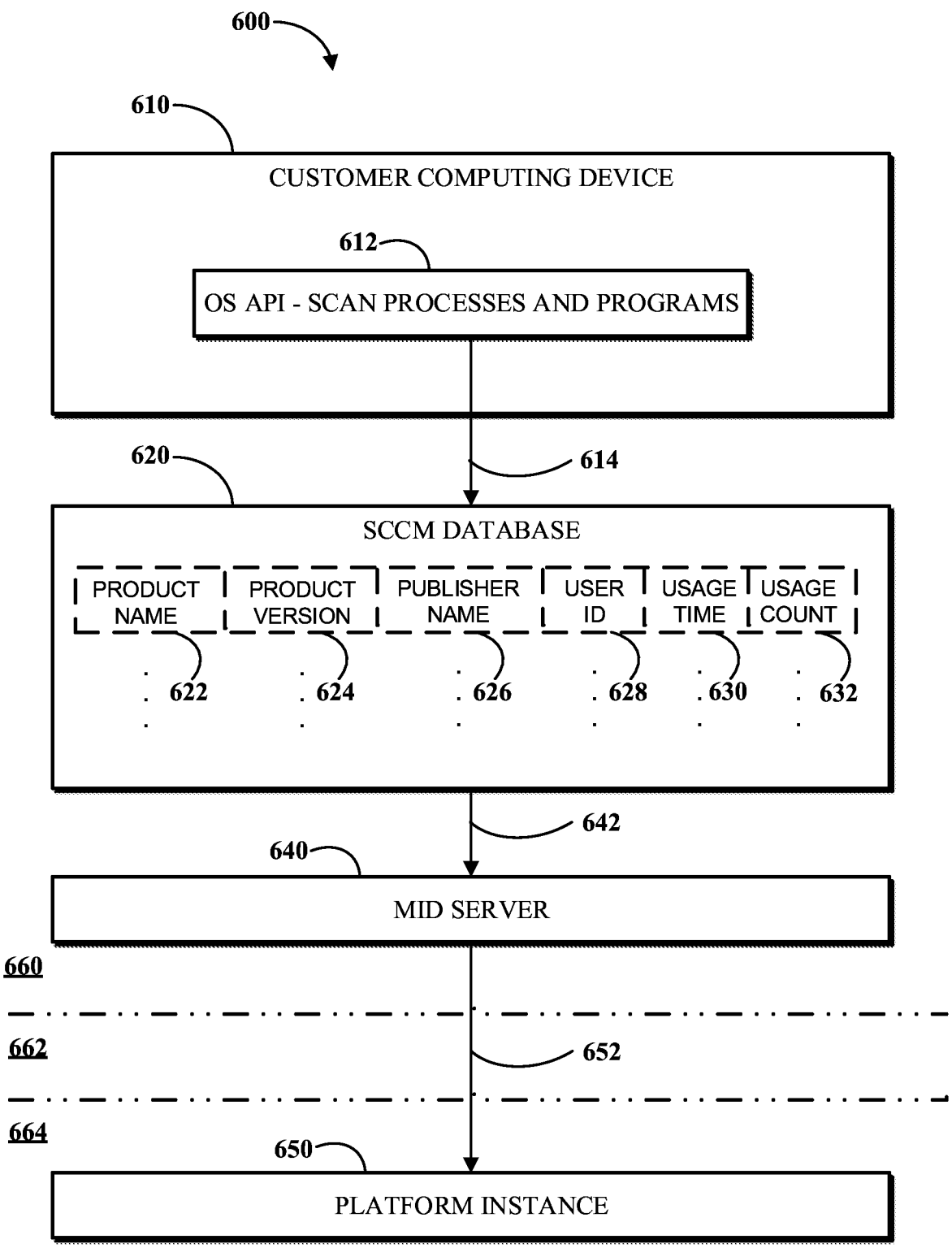
FIG. 6 is a block diagram of an implementation of a system usable for tracking software usage in a computing network.

FIG. 6 is a block diagram of an implementation of a system 600 usable for tracking software usage in a computing network. Tracking software usage may be similar but different from the techniques for tracking software installations. Similar data gathering techniques (e.g., SCCM, discovery probes against individual computing devices, etc.) may be used, however, software usage data for a computing device is ultimately sourced from an application programming interfaces (API) for the operating systems (OS) running on the computing device that facilitates the gathering of software usage data, rather than from the registry. For example, software usage data may include usage time aggregation, usage count, etc. For example, Microsoft® provides an API to obtain that information from programs and processes running on a computing device instead of the registry. The system 600 is operable to implement such a technique for gathering software usage information for software usage tracking. Technique 300 of FIG. 3 and technique 400 of FIG. 4 may be applied to strings in data gathered and processed by the system 600.

The example system 600 includes a customer computing device 610 with an OS API 612 that enables scanning of running processes and/or programs running on the computing device 610 to gather usage information. For example, the customer computing device 610 may include the computing device 200 and the OS API 612 may be included in the memory 206.

The example system 600 includes an SCCM database 620, which may be running on a computing device in a private network 660 (e.g., a firewalled private network) with the customer computing device 610. In some implementations (not shown), the SCCM database 620 may run on the customer computing device 610. The SCCM database 620 includes a table of software usage data for computing devices operating within the private network 660. The table of software usage information may be populated by scans of processes and/or programs running on computing devices in the private network 660. For example, a scan 614 using the OS API 612 of the customer computing device 610 may be conducted to gather information about software usage on the customer computing device 610 and update records in the table based on this gathered information. Records in this table include the fields: product name 622, product version 624, publisher name 626, user ID 628; usage time 630 and usage count 632. These fields may be strings. A user ID 628 (e.g., a user name or credential) may identify a user or users that have invoked the software component running on a computing device in the private network 660. A usage time 630 may reflect a total amount of time a process or program has been running on a computing device during a current session or over some analysis period of time (e.g., a day, a week, a month, or a year). For example, a usage time 630 may be stored as a string, as an integer (e.g., a number of milliseconds), or as a tuple of integers (e.g., counts of hours, minutes, seconds, and/or milliseconds). For example, a usage count 632 may reflect a number of distinct users that have invoked a process or program over some analysis period of time (e.g., a day, a week, a month, or a year). For example, a usage count 632 may be stored as a string or as an integer.

The example system 600 includes a MID server 640, which may be operating in the private network 660. The MID server 640 may be configured to perform discovery operations (e.g., invoking discovery probes) on behalf of a platform instance 650 that manages operations of the private network 660 from outside of the private network 660. The MID server 640 may query 642 the SCCM database 620 to retrieve information from the table about software components running in the private network 660. The MID server may then relay to the platform instance 650 discovery probe data 652 that is based on the results of the query 642. The discovery probe data 652 may be transmitted from the private network 660, via an intermediary network 662 (e.g., the Internet), to the platform instance 650 operating in a provider network 664 (e.g., in the datacenter 108).

The platform instance 650 may store records (e.g., configuration items) based on the discovery probe data 652. For example, the platform instance may run on the application server 112. For example, configuration items in a CMDB (e.g., running on the database server 116) maintained by the platform instance 650 may be generated or updated based on the discovery probe data 652. This stored data (e.g., configuration items in a CMDB) may represent the software components running on computing devices within the private network 660.

Because the software installation data and the software usage data for a private computing network come from different data sources, there may be mismatches in strings identifying software components occurring in these data sets (e.g., mismatches between a product name 522 and a correspond product name 622), even though the strings describe the same underlying software component installed and running on one or more computing devices in a private network. Information mismatch between strings from registry data and strings from running process data may make it difficult to match a software usage record to a corresponding software installation record. Matching software usage records to a software installation records may be useful for performing certain management tasks, such as uninstalling underutilized software components in a private network. In order to find a link or match between software installation data and software usage data, matching techniques (e.g., the technique 300 of FIG. 3) described herein may be used to find a close (e.g., the closest in a database table) combination of (publisher name, product name, product version) between software usage data and software installation data. There may be other implementations where data is obtained from disparate data sources that may need to be matched (e.g., other than the data sources of the example systems 500 and 600 of FIGS. 5 and 6).

Figure 7:
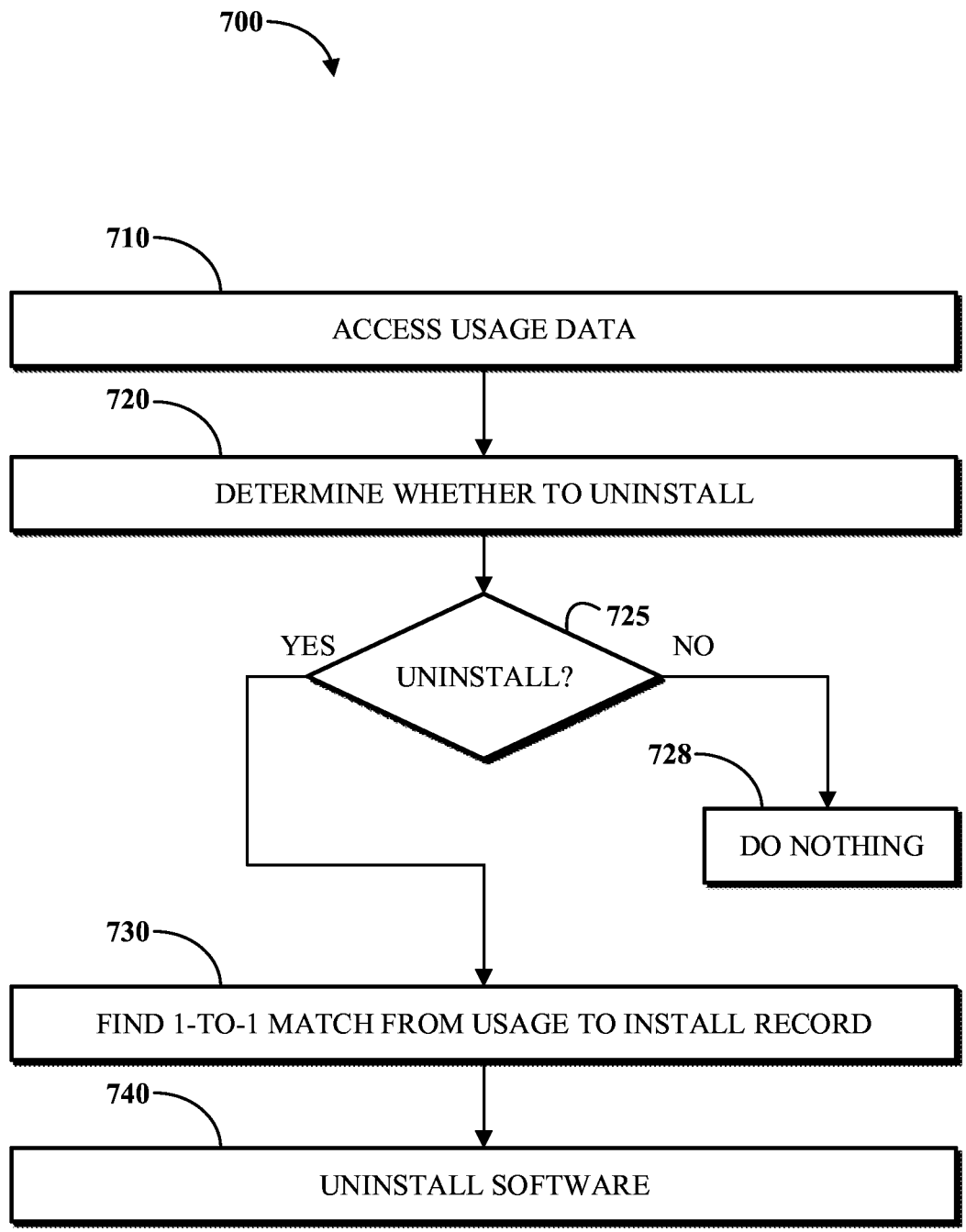
FIG. 7 is a logic flowchart illustrating an example of a technique for uninstalling software based on software usage data that may not be normalized.

FIG. 7 is a flowchart illustrating an example of a technique 700 for uninstalling software based on software usage data that may not be normalized in an electronic computing and communications system, such as the system 100 as generally illustrated in FIG. 1. In some implementations, the technique 700 can be executed using computing devices, such as the systems, modules, and devices described with respect to FIGS. 1, 2, 5, 6, 8, and 9. In some implementations, the technique 700 can be performed, for example, by executing a machine-readable program or other computer-executable instructions, such as instructions or programs described according to JavaScript, C, or other such instructions. The steps, or operations, of the technique 700 or any other technique, method, process, or algorithm described in connection with the implementations disclosed herein can be implemented directly in hardware, firmware, software executed by hardware, circuitry, or a combination thereof. For example, the technique 700 may apply the technique 300 of FIG. 3 and technique 400 of FIG. 4 to strings in data gathered and processed by the system 500 and the system 600.

The example technique 700 includes accessing 710 software usage data; determining 720 whether to uninstall a software component in the computing network based on the usage data; when (at operation 725) a determination to uninstall a software resource is made, finding 730 a 1-to-1 match from software usage data to a software installation record (e.g., a configuration item); and uninstalling 740 a software component in the computing network that is represented by the software installation record. When (at operation 725) it is determined 720, based on the software usage data, that a software component will not be uninstalled, the technique 700 does nothing 728 with the software component in question.

The example technique 700 includes accessing 710 software usage data. For example, the software usage data may be accessed 710 by a platform instance (e.g., the platform instance 650) by reading one or more records from a database (e.g., a CIVIDB) storing software usage data. For example, the techniques described in relation to the system 600 of FIG. 600 may be used to and/or access 710 software usage data.

The example technique 700 includes determining 720 whether to uninstall a software component in the computing network based on the usage data. For example, whether to uninstall a software component may be determined 720 by comparing a usage time (e.g., a usage time 630) to a threshold. For example, whether to uninstall a software component may be determined 720 by comparing a usage count (e.g., a usage count 632) to a threshold. For example, whether to uninstall a software component may be determined 720 by comparing a usage time to usage times for other software components running in the private network. For example, whether to uninstall a software component may be determined 720 by comparing a usage count to usage counts for other software components running in the private network.

The example technique 700 includes finding 730 a match from software usage data to a software installation record (e.g., a configuration item) in a set of software installation records. These software installation records include one or more strings (e.g., product name 622, product version 624, and publisher name 626) that may identify a software component installed in the computing network that is represented by the installation record. One or more corresponding stings (e.g., product name 522, product version 524, and publisher name 526) from the software usage data may be compared (e.g., using the technique 300 of FIG. 3) to these strings from the set of installation records (e.g., configuration items) in a table of installation records (e.g., in a CMDB) to identify matching strings. A 1-to-1 match between usage data and an installation record may be found 730 based on one or more matches between string(s) from the usage data and string(s) from the installation record.

The example technique 700 includes, responsive to the match(es), uninstalling 740 an installed software. For example, the installed software may be uninstalled 740 responsive to identification (at operation 350) of a match between a string from a set of strings for installed software components that is associated with a record for the installed software and a unrecognized string that is associated with the software usage data.

Although the technique 700 is shown as a series of operations for clarity, implementations of the technique 700 or any other technique, process, or algorithm described in connection with the implementations disclosed herein can be performed in various orders or concurrently. Additionally, operations in accordance with this disclosure can be performed with other operations not presented and described herein. For example, the technique 700 may be initiated in response to a request from a user (e.g., a system administrator of a private network) or initiated periodically based on the expiration of a timer. Furthermore, one or more aspects of the systems and techniques described herein can be omitted. For example, the uninstall 740 is an operation that may be omitted and replaced with the sending and/or presentation of an alert message to a user (e.g., a system administrator) recommending that a software component represented by the found installation record be uninstalled.

Figure 8:
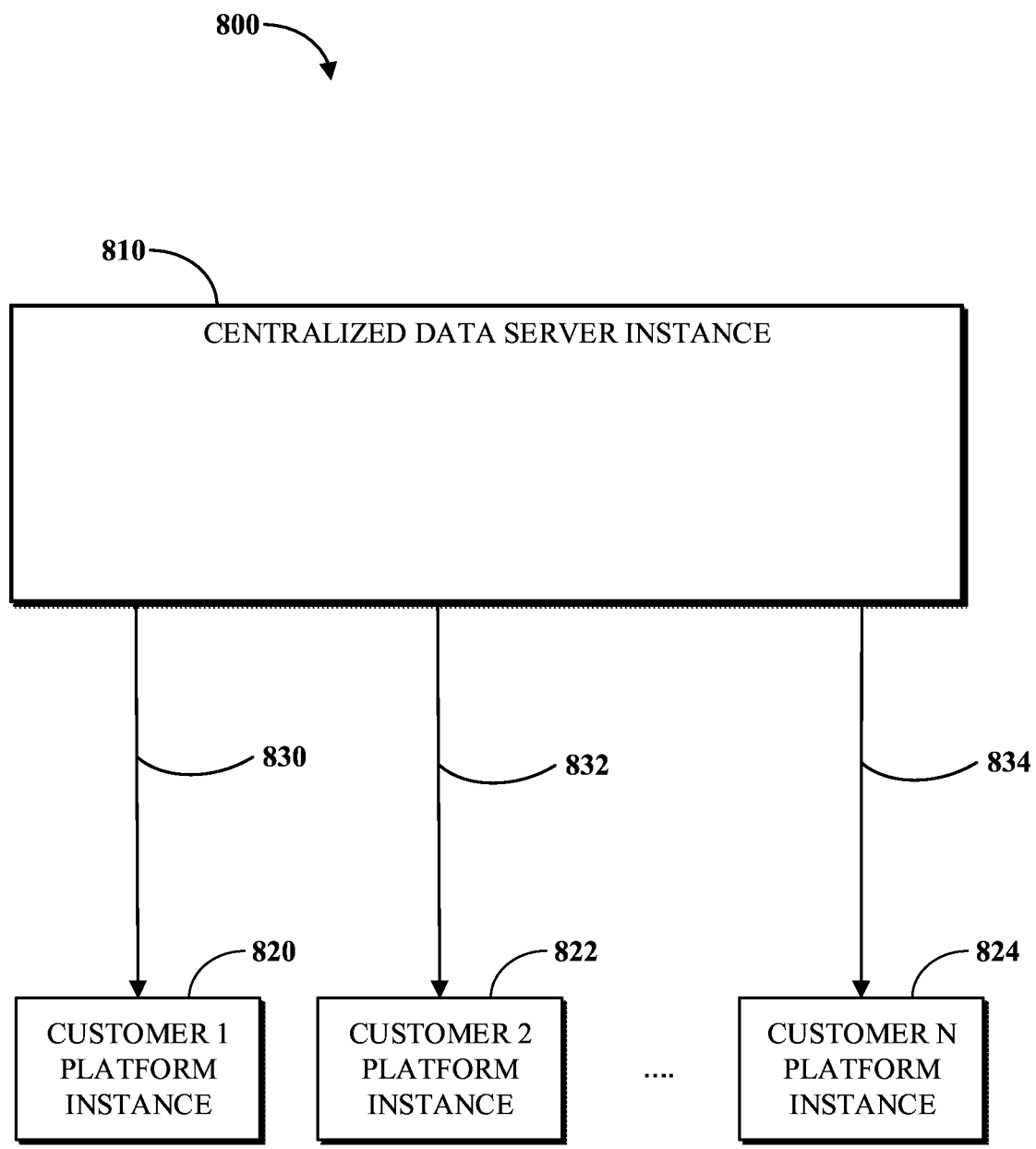
FIG. 8 is a block diagram of an implementation of a system usable for sharing information to facilitate recognition of computing resources in computing networks.

FIG. 8 is a block diagram of an implementation of a system usable for sharing information to facilitate recognition of computing resources in computing networks. One significant challenge in managing computing networks is to recognize all those software products that may be encountered (e.g., all the software products in the world) and assign computing resources that are encountered into a correct standardized or normalized bucket that is associated with information about the software products that can be utilized for managing computing networks. For example, Microsoft Word 1.1.1® and Word Premium® should fall into the same product and publisher buckets. In order to normalize the software products, many (e.g., hundreds, thousands, or more) normalization rules may be created to send the products into standardized buckets. Since the volume of normalization rules may be large and might be growing slowly when we add more rules, it may be less efficient to store a copy of the normalization rule data for each private network managed by a network management service provider. For this reason, a centralized server may be used to maintain and provide normalization rules for use in the management of multiple customer computing networks. The system 800 may be operable to implement a technique for sharing information to facilitate recognition of computing resources in computing networks. The technique 300 of FIG. 3 and the technique 400 of FIG. 4 may be applied to strings in data gathered and processed by the system 800.

The example system 800 includes a centralized data server instance 810 and multiple customer platform instances (including, customer 1 platform instance 820, customer 2 platform instance 822, and customer N platform instance 824) that are configured to manage respective private computing networks of customers of a computing network management service provider. As part of providing computing network management services, the platform instances (e.g., customer 1 platform instance 820, customer 2 platform instance 822 and customer N platform instance 824) may respectively access normalization rules (830, 832, and 834) stored by the centralized data server instance 810 that are used to identify and/or normalizes records representing computing resources detected (e.g., using discovery probes) in their respective computing networks.

Figure 9:
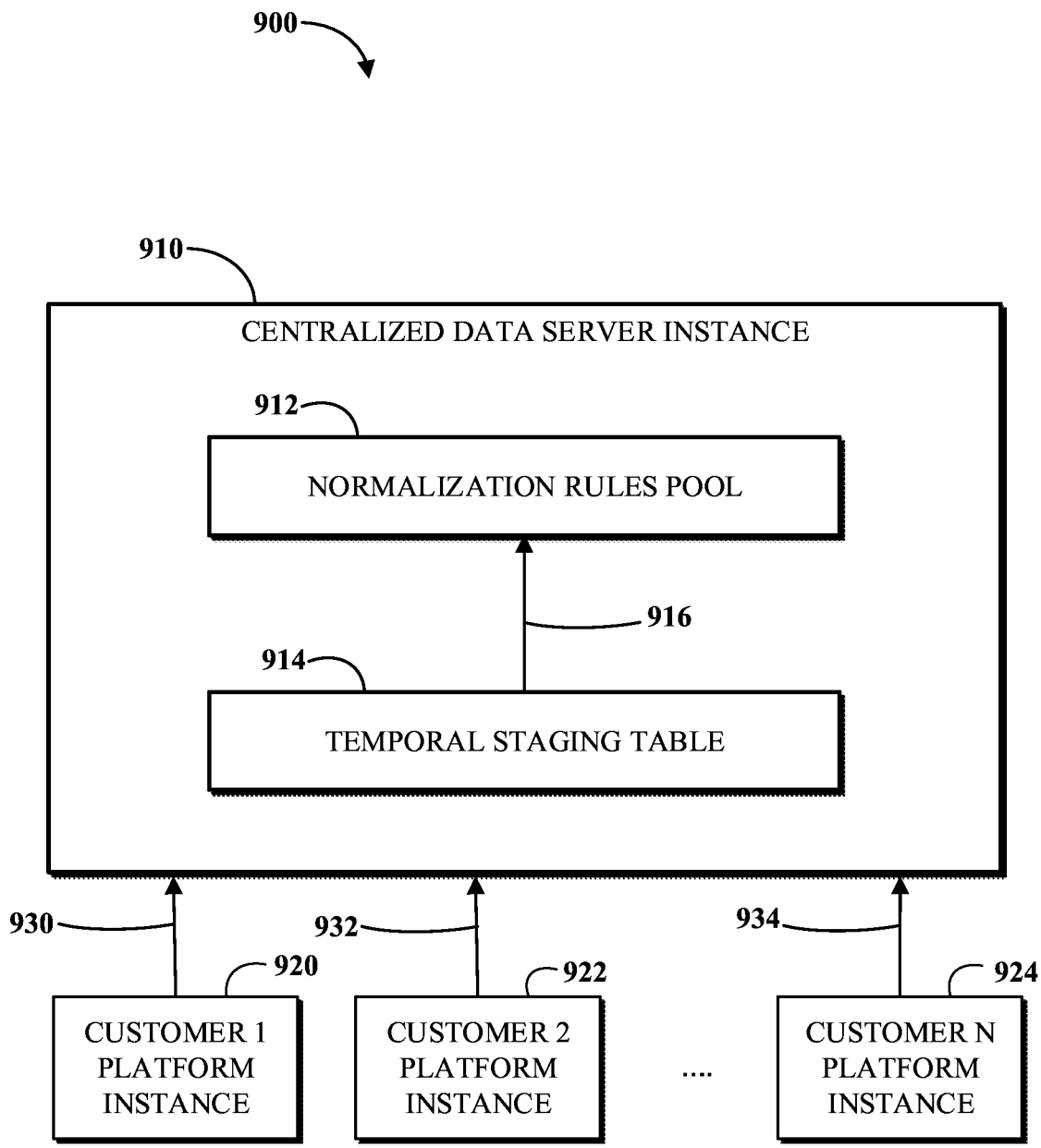
FIG. 9 is a block diagram of an implementation of a system usable for sharing information to facilitate recognition of computing resources in computing networks.

FIG. 9 is a block diagram of an implementation of a system 900 usable for sharing information to facilitate recognition of computing resources in computing networks. In order to efficiently add normalization rules, one approach for adding new rules is to reference new data about computing resources detected (e.g., using discovery probes) in the customer computing networks. For example, when a customer platform instance (e.g., customer 1 platform instance 920, customer 2 platform instance 922, or customer N platform instance 924) attempts to normalize discovered data (e.g., a configuration item) representing computing resources and existing normalization rules do not cover the specific representation of the encountered computing resource, this unrecognized record or a portion thereof may be sent to the centralized data server instance 910. In some implementations, a content team working for the network management service provider may check this unrecognized record and create new rules to cover it and add these new rules to a pool of normalization rules maintained by the centralized data server instance 910. In some implementations, the generation of new normalization rules may be partially or completely automated. Determining new normalization rules may include finding a close (e.g., the closest occurring in a database table) combination of (publisher name, product name, product version) to a pre-existing standardized bucket mapped to by the normalization rules. For example, matching techniques (e.g., the technique 300 of FIG. 3) described herein may be used to find a close combination of (publisher name, product name, product version). The system 900 may be operable to implement a technique for adding normalization rules to a shared pool of normalization rules to facilitate recognition of computing resources in computing networks. For example, by sharing normalization rules across multiple customers a pool of normalization rules may be updated more frequently and achieve greater coverage and efficiency for the customers. The technique 300 of FIG. 3 and the technique 400 of FIG. 4 may be applied to strings in data gathered and processed by the system 900. The system 900 may be used to update normalization rules in a shared pool that are used by the system 800 of FIG. 8.

The example system 900 includes a centralized data server instance 910 and multiple customer platform instances (including, customer 1 platform instance 920, customer 2 platform instance 922, and customer N platform instance 924) that are configured to manage respective private computing networks of customers of a computing network management service provider. The centralized data server instance 910 may maintain and store a normalization rule pool 912 that includes rules for mapping records representing computing resource to bins of computing resources. When providing computing network management services, the platform instances (e.g., customer 1 platform instance 920, customer 2 platform instance 922, and customer N platform instance 924) may respectively detect (e.g., using discovery probes) records (930, 932, and 934) representing computing resources that are not covered by the existing normalization rules. One or more strings associated with these records (930, 932, and 934) may be an unrecognized string. These records (930, 932, and 934) may be sent to the centralized data server instance 910 for analysis. The centralized data server instance 910 may store the records (930, 932, and 934) in a temporal staging table 914 for analysis at a later time (e.g., when a user initiates an analysis process or when a timer expires). At this later time, the records (930, 932, and 934) are analyzed using the matching techniques (e.g., the technique 300 of FIG. 3) described herein and one or more new normalization rules 916 are determined. These new normalization rules may then be added to the normalization rules pool 912 and made available to the platform instances (e.g., customer 1 platform instance 920, customer 2 platform instance 922, and customer N platform instance 924), as described in relation to FIG. 8.

For example, the database access steps described herein may implemented using a My SQL API.

An implementation of this disclosure is a system for normalizing strings to identify computing resources and improve performance and utilization of computing resources. The system includes a means for determining a comparison length based on lengths of strings in a set of strings; a means for padding a first string from the set of strings to the comparison length to obtain a padded string; a means for receiving a second string; a means for determining a distance between the second string and the padded string; and a means for identifying a match between the first string and the second string based on the distance.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system operable to normalize a plurality of strings associated with respective computing resources of a computing network, the system comprising:
   a memory; and
   a processor, wherein the memory includes instructions executable by the processor to cause the system to:
      update the plurality of strings by adding one or more strings to the plurality of strings or removing one or more strings from the plurality of strings;
      responsive to the update, determine a comparison length for the plurality of strings based on a length of each of the plurality of strings and a respective weight associated with each of the plurality of strings, wherein the respective weight is based on an installation frequency of a computing resource of the respective computing resources described by a string;
      in response to the plurality of strings having respective lengths less than the comparison length, pad the plurality of strings using one or more randomly generated characters to increase the respective lengths to the comparison length to obtain a plurality of padded strings, wherein the one or more randomly generated characters comprise one or more characters that are absent from the plurality of strings;
      receive a first string associated with an unidentified computing resource;
      determine respective counts of character operations to be performed to transform characters of the first string to characters of each of the padded plurality of strings;
      compare the respective counts to a threshold;
      identify a match between the first string and a second string of the plurality of padded strings based on the respective count of character operations performed being below the threshold;
      determine the first string to be associated with a known computing resource associated with the second string instead of the unidentified computing resource based on the match; and
      uninstall the known computing resource based on the determination of the first string being associated with the known computing resource of the respective computing resources.

2. The system of claim 1, wherein the memory includes instructions executable by the processor to cause the system to:
   responsive to the match, modify the first string based on the second string from the plurality of strings to obtain a normalized string; and
   store, display, or transmit the normalized string.

3. The system of claim 1, wherein the instructions to determine the comparison length include instructions executable by the processor to cause the system to:
   determine the comparison length as a weighted average of the weights associated with each of the plurality of strings.

4. The system of claim 1, wherein the instructions to determine the comparison length include instructions executable by the processor to cause the system to:
   rank software publishers associated with strings of the plurality of strings based on indications of an extent or frequency of installations of software published by the software publishers;
   determine respective weights for strings of the plurality of strings based on the rank of a software publisher associated with the respective string; and
   determine a weighted average of lengths of strings of the plurality of strings using the respective weights for the strings of the plurality of strings.

5. The system of claim 1, wherein the instructions to pad each of the plurality of strings to the comparison length include instructions executable by the processor to cause the system to:
   append one or more of the one or more randomly generated characters to the plurality of strings.

6. The system of claim 1, wherein the instructions to determine the respective counts include instructions executable by the processor to cause the system to:
   determine the respective counts using a dynamic programming algorithm to determine a Damerau-Levenshtein distance between the first string and each of the padded plurality of strings.

7. The system of claim 1, wherein each of the plurality of strings are associated with a record for an installed software, the first string is associated with a software usage record, and the memory includes instructions executable by the processor to cause the system to:
   responsive to the match, uninstall the installed software.

8. A method for normalizing a plurality of strings associated with respective computing resources of a computing network, the method comprising:
   updating the plurality of strings by adding one or more strings to the plurality of strings or removing one or more strings from the plurality of strings;
   responsive to the update, determining a comparison length for the plurality of strings based on a length of each of the plurality of strings and a respective weight associated with each of the plurality of strings, wherein the respective weight is based on an installation frequency of a computing resource of the respective computing resources described by a string;
   in response to the plurality of strings having respective lengths less than the comparison length, padding the plurality of strings using one or more randomly generated characters to increase the respective lengths to the comparison length to obtain a plurality of padded strings, wherein the one or more randomly generated characters comprise one or more characters that are absent from the plurality of strings;
   receiving a first string associated with an unidentified computing resource;
   determining respective counts of character operations to be performed to transform characters of the first string to characters of each of the padded plurality of strings;
   comparing the respective counts to a threshold;
   identifying a match between the first string and a second string of the plurality of padded strings based on the respective count of character operations performed being below the threshold; and
   determining the first string to be associated with a known computing resource associated with the second string instead of the unidentified computing resource based on the match; and
   uninstalling the known computing resource based on the determination of the first string being associated with the known computing resource of the respective computing resource.

9. The method of claim 8, comprising:
responsive to the match, modifying the first string based on the second string from the plurality of strings to obtain a normalized string; and
storing, displaying, or transmitting the normalized string.

10. The method of claim 8, wherein determining the comparison length comprises:
determining the comparison length as a weighted average of the respective weights associated with each of the plurality of strings.

11. The method of claim 8, wherein determining the comparison length comprises:
ranking software publishers associated with strings of the plurality of strings based on indications of an extent or frequency of installations of software published by the software publishers;
determining respective weights for strings of the plurality of strings based on the rank of a software publisher associated with the respective string; and
determining a weighted average of lengths of strings of the plurality of strings using the respective weights for the strings of the plurality of strings.

12. The method of claim 8, wherein padding each of the plurality of strings to the comparison length comprises:
appending one or more of the randomly generated characters to the plurality of strings.

13. The method of claim 8, wherein determining the respective counts comprises:
using a dynamic programming algorithm to determine a Damerau-Levenshtein distance between the first string and each of the padded plurality of strings.

14. The method of claim 8, comprising:
responsive to the match, uninstalling an installed software, wherein each of the plurality of strings are associated with a record for the installed software and the first string is associated with a software usage record.

15. A system operable to facilitate matching of a plurality of strings associated with respective computing resources of a computing network, the system comprising:
a memory; and
a processor, wherein the memory includes instructions executable by the processor to cause the system to:
update the plurality of strings by adding one or more strings to the plurality of strings or removing one or more strings from the plurality of strings;
responsive to the update, determine a comparison length for the plurality of strings based on a length of each of the plurality of strings and a respective weight associated with each of the plurality of strings, wherein the respective weight is based on an installation frequency of a computing resource of the respective computing resources;
in response to the plurality of strings having respective lengths less than the comparison length, pad the plurality of strings using one or more randomly generated characters to increase the respective lengths to a comparison length to obtain a plurality of padded strings, wherein the one or more randomly generated characters comprise one or more characters that are absent from the plurality of strings;
receive a first string associated with an unidentified computing resource;
determine respective counts of character operations to be performed to transform characters of the first string to characters of each of the padded plurality of strings;
compare the respective counts to a threshold;
identify a match between the first string and a second string of the plurality of padded strings based on the respective count of character operations performed being below the threshold
determine the first string to be associated with a known computing resource of the respective computing resources associated with the second string instead of the unidentified computing resource based on the match; and
uninstall the known computing resource based on the determination of the first string being associated with the known computing resource of the respective computing resource.

16. The system of claim 15, wherein each of the plurality of strings are associated with a record for an installed software, the first string is associated with a software usage record, and the memory includes instructions executable by the processor to cause the system to:
responsive to the match, uninstall the installed software.

* * * * *